United States Patent [19]

Takezawa et al.

[11] Patent Number: 4,690,969
[45] Date of Patent: Sep. 1, 1987

[54] POLYPHENYLENE SULFIDE RESIN COMPOSITIONS AND THEIR MOLDINGS

[75] Inventors: Yoshio Takezawa; Tatsuo Akatsu, both of Nagoya, Japan

[73] Assignee: Toray Industries, Inc., Tokyo, Japan

[21] Appl. No.: 862,751

[22] Filed: May 13, 1986

[30] Foreign Application Priority Data

May 23, 1985 [JP] Japan .................... 60-111219

[51] Int. Cl.$^4$ ............................................... C08K 3/16
[52] U.S. Cl. ..................... 524/413; 428/419
[58] Field of Search .............. 524/413, 93; 428/419; 427/190; 528/388; 252/518

[56] References Cited

U.S. PATENT DOCUMENTS

| 3,616,186 | 10/1971 | Blackwell | 428/419 |
| 3,879,355 | 4/1975 | Blackwell | 528/388 |
| 4,012,539 | 3/1977 | Davies | 524/413 |
| 4,102,954 | 7/1978 | Coale | 528/388 |

FOREIGN PATENT DOCUMENTS 2065027  6/1981  United Kingdom .

OTHER PUBLICATIONS

CA 80 146680v (1974).
CA 82 87090u (1975).

*Primary Examiner*—Veronica P. Hoke
*Attorney, Agent, or Firm*—Austin R. Miller

[57] ABSTRACT

The polyphenylene sulfide resin compositions being composed of polyphenylene sulfide having a unit represented by general formula:

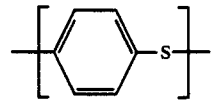

and halogenized copper are excellent in weather ability and the supersonic and other welds of their moldings are exceptionally superior in strength.

7 Claims, 2 Drawing Figures

POLYPHENYLENE SULFIDE RESIN COMPOSITIONS AND THEIR MOLDINGS

BACKGROUND OF THE INVENTION

1. Field of the Invention

The present invention relates to the polyphenylene sulfide resin compositions which are excellent in weather ability and whose supersonic and molding welds are increased in strength, and also relates to their moldings.

Polyphenylene sulfide resins are substantially excellent in heat resistance (incl. short- and long-term characteristics), chemical resistance, flame resistance, size stability and other properties. Being superior in moldability also, they are injection molded for so-called engineering purposes in electric, electronic, automotive and other industries. Their demand is therefore forecast to increase further in future and they are expected to become used to produce films, fibers and other extrusion moldings.

2. Description of the Prior Art

Polyphenylene sulfide resins thus have a variety of features. It is however their substantially-only defect that they are not excellent in ultraviolet ray stability and weather ability. Therefore, they are not suitable for such materials used outdoors as extrusion moldings, films, fibers and others, as well as for indoor strong ultraviolet ray exposition purposes. For example when extrusion moldings, films and fibers are used outdoors, the surface of moldings becomes rough, causes microcracks, considerably decreases in mechanical strength, changes dark brown or decreases in transparency. The defect of polyphenylene sulfide resins being inferior in weather ability has hitherto been known so much efforts have been paid to obviate them in a variety of sectors. It is included among their major features that they are very excellent in heat resistance. This defect always requires molding temperature to be raised to a considerably-high value. Its standard ranges between about 300° and 360° C. Those concerned have a common knowledge that it is necessary for the improvement in characteristics to add suitable additives to so-called universal thermoplastic whose molding temperature is below 300° C. and universal engineering resins. The improvement in weather ability of polyolefins for example that is included among the purposes of the present invention is made by adding ultraviolet absorbents and/or oxidation preventives. Polyphenylene sulfide resins however require molding temperature. The additives for the improvement in characteristics are required to have the resistances to more than 350° C. heat i.e. neither sublimate nor vaporize and do not change in quality due to deterioration at these temperatures. At present no more than 350° C. heat resistant ultraviolet ray absorbents have been put on the market and published although makers continue research efforts. Few patents or literatures references have been published as regards the improvement in weather ability of polyphenylene sulfide resins. Only Japanese Unexamined Patent Publication No. 100139/1984 can be cited in this connection. The purpose of the present invention is to provide the resin compositions composed of polyphenylene sulfide and a carbon black with a mean particle diameters less than 30 m. The latter's addition for the improvement in weather ability is a know technique in plastic industry. It applies to polyphenylene sulfide resins. The description of the embodiments of the present invention purports that they are improved in weather ability by adding 10% by weight, a considerably-larger amount than that used for ordinary blacking, of carbon black. The inventors added 0.5% by weight, the ordinary addition amount for the blacking of polyphenylene sulfide, of carbon black for comparison. As the result, however, it was found that the weather ability improvement effect of the polyphenylene sulfide resin obtained thereby is too small for standing outdoor use. It is aggreeable in view of this fact that several to 10% by weight order addition ratios are necessary to attain the weather ability standing outdoor use as stated in connection with the embodiments of Japanese Unexamined Patent Publication No. 10013/1984.

Besides cited among the preferable characteristics of polyphenylene sulfide resins is the strength of supersonic and molding welds. It can neither be said to be considerably smaller than that of other resins nor fatally defective. The insufficient strength causes design restrictions, cracks in parts assembling process and other troubles. It is a fact that these obstruct the increase of the purposes of polyphenylene sulfide resins. The study for their increase in strength is earnestly being carried out by various companies.

As stated above, the prior art described in the patent with Japanese Unexamined Patent Publication No. 100139/1984 for example lays down the following restrictions for successfully raising the weather ability that can be said to be the substantially-only defect of polyphenylene sulfide resins. Namely:

(1) They can only be used for black colored goods but not for films that require transparency.
(2) They considerably lower the electric characteristics that are included among the features of polyphenylene sulfide resins since carbon black being inferior in insulation performance is added in great quantities.
(3) Their supersonic and other welds are not increased in strength.

SUMMARY OF THE INVENTION

A purpose of the present invention is to provide the polyphenylene sulfide resin compositions being excellent in weather ability with their transparency, electric insulation performances and heat insulation resistance maintained.

Another purpose of the present invention is to provide the polyphenylene sulfide resin moldings whose welds are increased in strength.

A further object of the present invention is to provide the polyphenylene sulfide resin moldings whose supersonic welds are increased in strength.

To attain the purposes, the present invention contemplates the polyphenylene sulfide resin composition being composed of the polyphenylene sulfide whose main component is a unit represented by formula:

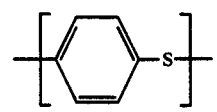

(I)

and halogenized copper, and their moldings.

DESCRIPTION OF PREFERRED EMBODIMENTS

Figure 1:
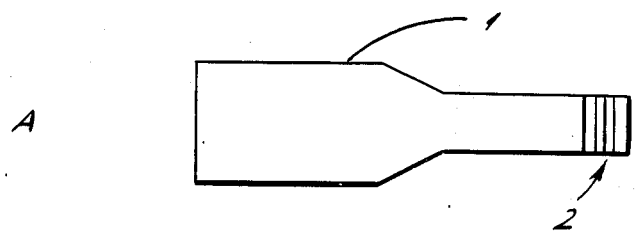
FIG. 1 shows a testpiece for testing the strength of the welds of the moldings according to the present invention, A and B being a plan and a side view, respectively, of that cut after cutting-off.
Figure 1:
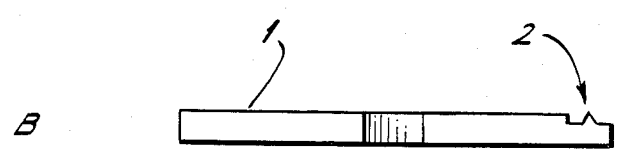

The polyphenylene sulfide of the present invention has a unit represented by general formula

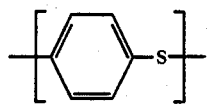

as main component and present in an amount preferably more than 90 mol %, more preferably more than 95 mol %. If the unit of

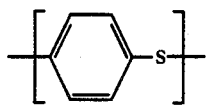

is below 90 mol %, the heat and chemical resistance among the features of polyphenylene sulfide resins decrease because of the shortage in crystallinity of polymers.

The other units of polyphenylene sulfide are permitted to be randum copolymerizable. Cited for example thereamong are a methaphenylene sulfide unit

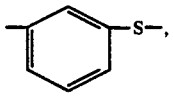

a diphenyl ether unit

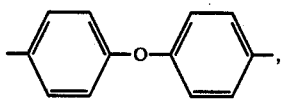

diphenyl sulfone unit

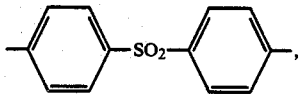

a biphenyl sulfide unit

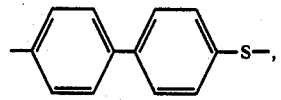

a naphthyl sulfide unit

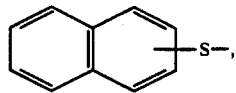

a substituent phenyl sulfide unit

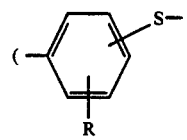

wherein R is a alkyl group, a nitrophenyl group, an alkoxy group and other substituents) and a trifunction phenyl sulfide unit

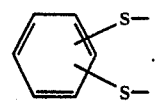

It is permitted to use any of the methods known in polymer industry for producing polyphenylene sulfide resins. Namely polyphenylene sulfide resins are generally produced by polycondensing p-dihalobenzene and alkali sulfide. They can roughly be divided in two—a method for producing straight chain high-molecules (partial branching is made in some cases) having practical molecular weights by polycondensation and a method for producing the resins having practical characteristics by the partial bridging with a system containing oxygen after producing prepolymers through polycondensation. The latter are generally used as the material of the compounds reinforced by glass fibers, carbon fibers, fillers and so forth while the former are used as the material of the compounds as well as of film fibers and so forth. The polyphenylene sulfide used according to the present invention may be obtained by either of the both methods. However the methods for producing their resins are not limited.

On the other hand, used among the halogenized coppers according to the present invention are cuprous iodide most preferably as well as cuprous chloride and bromide, unit of mixtures of cuprous halide with other organic compounds— for example

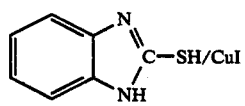

and so forth. The effects of the mixtures are produced mainly by cuprous halide. Their addition rate depends on expected effects. It should however range between 0.03% and 3% by weight of the copper per unit of resin preferably and between 0.06% and 1% by weight of the copper per unit of resin more preferably.

The polyphenylene sulfide resin compositions according to the present invention can be molded even in case they are substantially composed of polyphenylene sulfide resins and halogenized copper. Further those to be molded are permitted to contain a glass fiber, a carbon fiber, calcium carbonate, talc, calcium sulfate or another reinforcer or more than one being selected out of fillers; contain polyfluoro-olefin commonly called Teflon (R); or be the blendings with a small quantity of another polymer.

The methods of adding halogenized copper are not limited. Unless the condensation of polyphenylene sulfide is obstructed, this addition may be made at the start of polymerization or any time in the course of producing polyphenylene sulfide. A polyphenylene sulfide resin, a halogenized copper, an aforementioned reinforcer and/or a filler may be welded and kneaded if necessary be using an extruder, injection molded or subjected to so-called dry-blend extruction molding of films, fibers, sheets and so forth.

The thermoplastic resin compositions being composed of polyphenylene sulfide resins and halogenized copper and, in some cases, a reinforcer and/or a filler, a foaming agent, an oxidation preventive, a heat stabilizer, a lubricant, a nucleus agent, a colorant and another additive unless the effects of the present invention are obstructed. Cuprous halide should preferably be used in combination with a halogenized alkali metal with its compatibility with a polymer taken into account. Besides the thermoplastic resin compositions according to the present invention can be subjected to dyeing, printing and other working after being molded.

Being excellent in weather ability, the compositions and moldings according to the present invention are suitable for exposure to the atmosphere.

Having high strength, the compositions according to the present invention are suitable for producing moldings having the welds made when melted polymer currents meet each other in a mold.

The compositions according to the present invention are suitable for manufacturing moldings by welding a plurality of pieces since supersonic welds are excellent in strength.

The present invention will be described in further particulars in connection with its embodiments hereinafter.

EXAMPLE 1 AND COMPARATIVE EXAMPLES 1 TO 5

ASTM No. 1 type testpieces with a thickness of ⅛ inches was molded by using an injection molding machine Toshiba IS-75E with cylinder and mold temperatures fixed at 320° C. and 130° C. respectively after sufficiently mixing 0.5 part by weight of a compound shown in Table 1 with 100 parts by weight of a polyphenylene sulfide resin (Toray PPS resin A504) having a glass fiber content of about 40% by weight. Injection pressure was fixed at 400 kg/cm², injection time at 10 seconds and cooling time 15 seconds. Other testpieces were obtained for comparison by molding A504 itself without any additive under the same conditions.

To evaluate the weather ability of the testpieces, their tension characteristics before and after weather-o-meter radiation and the surface roughness of moldings were checked, the latter by naked eye, and the variation of their surface roughness was examined. Therein Sunshine Weather-O-Meter manufactured by Suga Test Instruments Co., Ltd., was used and black panel temperature and spray time were fixed at 63° C. and 18 minutes for 120 minutes respectively. Tension test was carried out at a speed of 5 mm/second in 50% RH atmosphere at 23° C. with the distance between chucks fixed at 114 mm. As regards surface roughness, the middle of their narrow parallel part was measured in terms of JIS 10-point mean roughness Rz at a speed of 0.3 mm/second by using a surface roughness manufactured by Tokyo Seimitsu Co., Ltd. with sweep length fixed at 2.5 mm. The results of this measurement are shown in Table 1.

TABLE 1

Relationship between the kinds and weather ability of additives

| No. | Additives | Surface roughness | Before radiation | | | After radiation | | | |
| --- | --- | --- | --- | --- | --- | --- | --- | --- | --- |
| | | | Tensile st. (kg/cm²) | Elongation (%) | Rz (μ) | Surface roughness | Tensile st. (kg/cm²) | Elongation (%) | Rz (μ) |
| Comparative example 1 | — | | 1.600 | 3.0 | 1.5 | Poor | 1.610 | 3.0 | 9.9 |
| Example 1 | CuI(1) | Excellent | 1.450 | 2.6 | 1.5 | Good | 1.470 | 2.7 | 2.0 |
| Comparative example 2 | Carbon black | Excellent | 1.580 | 2.8 | 1.5 | Fair | 1.530 | 2.6 | 6.9 |
| Comparative example 3 | MarkLA-51(2) | Excellent | 1.520 | 2.5 | 1.3 | Poor | 1.530 | 2.2 | 9.3 |
| Comparative example 4 | MarkLA-63(3) | Excellent | 1.350 | 2.3 | 1.0 | Poor | 1.350 | 2.2 | 8.5 |
| Comparative example 5 | TTB(4) | Excellent | 1.570 | 2.7 | 1.0 | poor | 1.580 | 2.6 | 9.1 |

Notes:
(1)0.2 part by weight of KI was additionally used in combination.
(2)Benzophenone ultraviolet ray absorbent produced by Adeka Argus Co., Ltd.
(3)High-molecular type hindered amine produced by Adeka Argus Co., Ltd.
(4)Benzotriazol ultraviolet ray absorbent produced by Adeka Argus Co., Ltd.

As is learned from Comparative Example 1 shown in Table 1, glass fiber reinforced polyphenylene sulfide resins did not decrease at all in the mechanical properties represented by tensile strength and elongation but considerably decreased in the roughness represented by surface roughness Rz with the glass fiber seen brilliant at their surface to eye on the 200 hours' radiation with the weather-o-meter.

The resin compositions obtained by adding 0.5 parts by weight of cuprous iodide mentioned in connection with Example 1, on the other hand, only slightly decreased on the 200 hours' radiation with the weather-o-meter. This was backed up by the fact that their Rz value—2.0μ—was considerably smaller than that of Comparative Example 1. They neither varied in tension characteristics.

Carbon black, benzophenone ultraviolet ray absorbent, hindered amine and benzotriazol ultraviolet ray absorbent that are ordinarily expected to contribute to the improvement in weather ability produced a little effect or no effect at all when the same quantity thereof was added (Comparative Examples 2 to 5).

EXAMPLES 2-5

The resin compositions obtained by adding 0.1, 0.2, 1.0 and 1.5 parts by weight of CuI to 100 parts by weight of the same glass fiber reinforced polyphenylene sulfide resin A504 as mentioned in connection with Example 1 were injection molded. The same method of evaluation as Example 1 was used therefor. Its results are shown in Table 2.

TABLE 2

Relationship between the addition ratio and weather ability of CuI

| | | Before radiation | | | | After radiation | | | |
|---|---|---|---|---|---|---|---|---|---|
| No. | Additives | Surface roughness | Tensile st. (kg/cm$^2$) | Elongation (%) | Rz ($\mu$) | Surface roughness | Tensile st. (kg/cm$^2$) | Elongation (%) | Rz ($\mu$) |
| Example 2 | 0.1 | Excellent | 1.570 | 2.7 | 1.7 | Good-Fair | 1.600 | 2.8 | 4.9 |
| Example 3 | 0.2 | Excellent | 1.480 | 2.5 | 1.5 | Good | 1.510 | 2.7 | 1.8 |
| Example 4 | 1.0 | Excellent | 1.500 | 2.6 | 1.9 | Good | 1.490 | 2.6 | 2.1 |
| Example 5 | 1.5 | Excellent | 1.480 | 2.6 | 2.0 | Good | 1.480 | 2.6 | 1.9 |

(Note)
(1) 0.2 part by weight of KI are added.

The weather ability improvement effect of that obtained by adding 0.1 part by weight of CuI (Example 2) somewhat small but larger than that of that obtained by adding 0.5 part by weight of carbon black (Comparative Example 2). That obtained by adding more than 0.2 parts by weight of CuI showed substantially-same the weather ability as Example 1. This indicates that more than 0.1 part by weight (Cu—more than 0.03%) should preferably be added to obtain the polyphenylene sulfide resins being excellent in weather ability.

EXAMPLE 6 AND COMPARATIVE EXAMPLE 6

Sufficiently mixed were 60 parts by weight of polyphenylene sulfide "Leiton" P-4 produced by Phillips Petroleum Co., 40 parts by weight of a chopped glass fiber, 0.5 part by weight of CuI and 0.5 part by weight of KI. This mixture was pelletized while welded and kneaded by using an extruding machine having a vent with cylinder temperature and vent pressure reduction degree fixed at 320° C. and −400 mmHg respectively. For comparison a mixture having other components than CuI and KI was pelletized under quite same the welding and kneading conditions. These pellets were molded into ⅛"-inch ASTM No. 1 testpieces and ⅛×½×5" square bars under the same conditions.

Table 3 shows the results of the tension test according to ASTMD 638 of the aforementioned moldings and their impact test according to ASTMD 256.

TABLE 3

| | Example 6 | Comparative Example 6 |
|---|---|---|
| CuI/KI | Present | Absent |
| Tensile strength (kg/cm$^2$) | 1570 | 1450 |
| Elongation (%) | 3.0 | 2.8 |
| Impact strength of testpieces and bars with notch (kg · cm/cm) | 10.6 | 10.5 |
| Impact strength of testpieces and bars without notch (kg · cm/cm) | 28 | 27 |

Table 3 shows that Example 6 has a larger strength than Comparative Example 6.

Two pieces were obtained by cutting ASTM No. 1 testpieces mentioned below and their small-width part was cut as shown in FIG. 1. The numerals 1 and 2 in the drawing denote a testpiece and its cut part.

Figure 2:
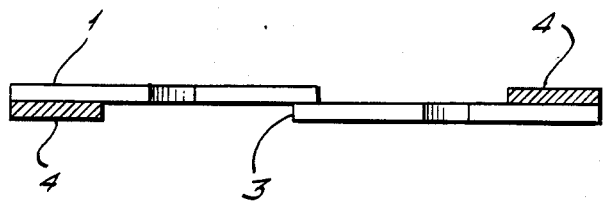
FIG. 2 is a side view of a supersonically-welded testpiece.

The testpiece and the remainder cut ones were brought into contact as shown in FIG. 2, subjected to 0.4 and 0.5 second welding at a pressure of 3 kg/cm$^2$ by using a supersonic welder manufactured by Branson Sonic Power Co. with amplitude fixed at 90$\mu$, spacers were stuck to each other and tension breakdown test (n=5) was carried out at a speed of 5 mm/minutes.

The numerals 3 and 4 in FIG. 2 denote a weld and a spacer respectively.

The results of tension test were shown in Table 4.

TABLE 4

| | Example 6 | | Comparative Example 6 | |
|---|---|---|---|---|
| CuI/KI | Present | | Absent | |
| Time (sec.) | 0.4 | 0.5 | 0.4 | 0.5 |
| Breakdown force (Kg) | 68 | 84 | 53 | 55 |

The table 4 shows that the supersonic welds of the compositions according to the present invention clearly increased in strength.

EXAMPLES 7 TO 12 AND COMPARATIVE EXAMPLE 7

The joint testpieces which have the same shape as ASTM No. 1 and whose weld is located at their middle with the ratio of CuI and KI addition varied to the same glass fiber reinforced polyphenylene sulfide resins (Toray A504) as used for Example 1.

Cylinder temperature: 320° C.
Die temperature: 80° C.
Injection pressure: 500 kg/cm$^2$
Injection time: 10 sec
Cooling time: 15 sec The testpieces were subjected to the tension breakdown at a speed 5 mm/second according to ASTMD 638 to obtain its stress (n=10). The results of this test are shown in Table 5.

TABLE 5

| | Addition ratio of CuI (Part) | Addition ratio of KI (Part) | Breakdown stress (Kg/cm$^2$) |
|---|---|---|---|
| Comparative Example 7 | 0 | 0 | 435 |
| Example 7 | 0.2 | 0.5 | 500 |
| Example 8 | 0.5 | 0.5 | 555 |
| Example 9 | 1.0 | 0.5 | 575 |
| Example 10 | 0.5 | 0 | 485 |
| Example 11 | 0.5 | 1.0 | 560 |
| Example 12 | 0.5 | 2.0 | 560 |

The table 5 indicates that the weld of the compositions according to the present invention is considerably increased in strength.

The results of Examples 1 to 12 and Comparative Examples 1–7 indicate that the compositions according to the present invention produce the following effects.
(a) Polyphenylene sulfide resins are considerably improved in weather ability without affecting their excellent mechanical characteristics.

(b) Polyphenylene sulfide resins can maintain transparency and are excellent in electric insulation performance since it is not indispensable to add carbon.

(c) The excellent mechanical characteristic of polyphenylene sulfide resins can further be raised and their supersonic and molding welds are considerably increased in strength.

What is claimed is:

1. A polyphenylene sulfide resin composition comprising at least 90 mol % polyphenylene sulfide having a unit represented by the formula:

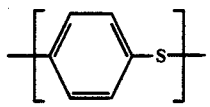

(I)

as main component and halogenized copper, the copper content of which is 0.03–3% by weight based on the weight of the polyphenylene sulfide.

2. A polyphenylene sulfide resin composition, as claimed in claim 1, wherein said halogenized copper is present as at least one compound selected from the group consisting of CuI, CuCl and CuBr.

3. A polyphenylene sulfide resin composition, as claimed in claim 1, wherein not more than 2 parts halogenized alkali metal per 100 parts by weight of the polyphenylene sulfide is added besides.

4. A molding of a polyphenylene sulfide resin composition comprising at least 90 mol % polyphenylene sulfide having a unit represented by formula (I) as main component and halogenized copper, the copper content of which is 0.03–3% by weight based on the weight of the polyphenylene sulfide.

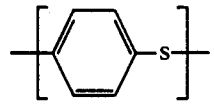

(I)

5. A molding, as claimed in claim 4, wherein a weld is provided by joining two melted resin components in a mold.

6. A molding, as claimed in claim 4, wherein said polyphenylene sulfide resin composition contains a fiber reinforcer.

7. A molding as claimed in claim 4, wherein a weld is provided to combine a plurality of molding pieces.

* * * * *